Patented May 17, 1927.

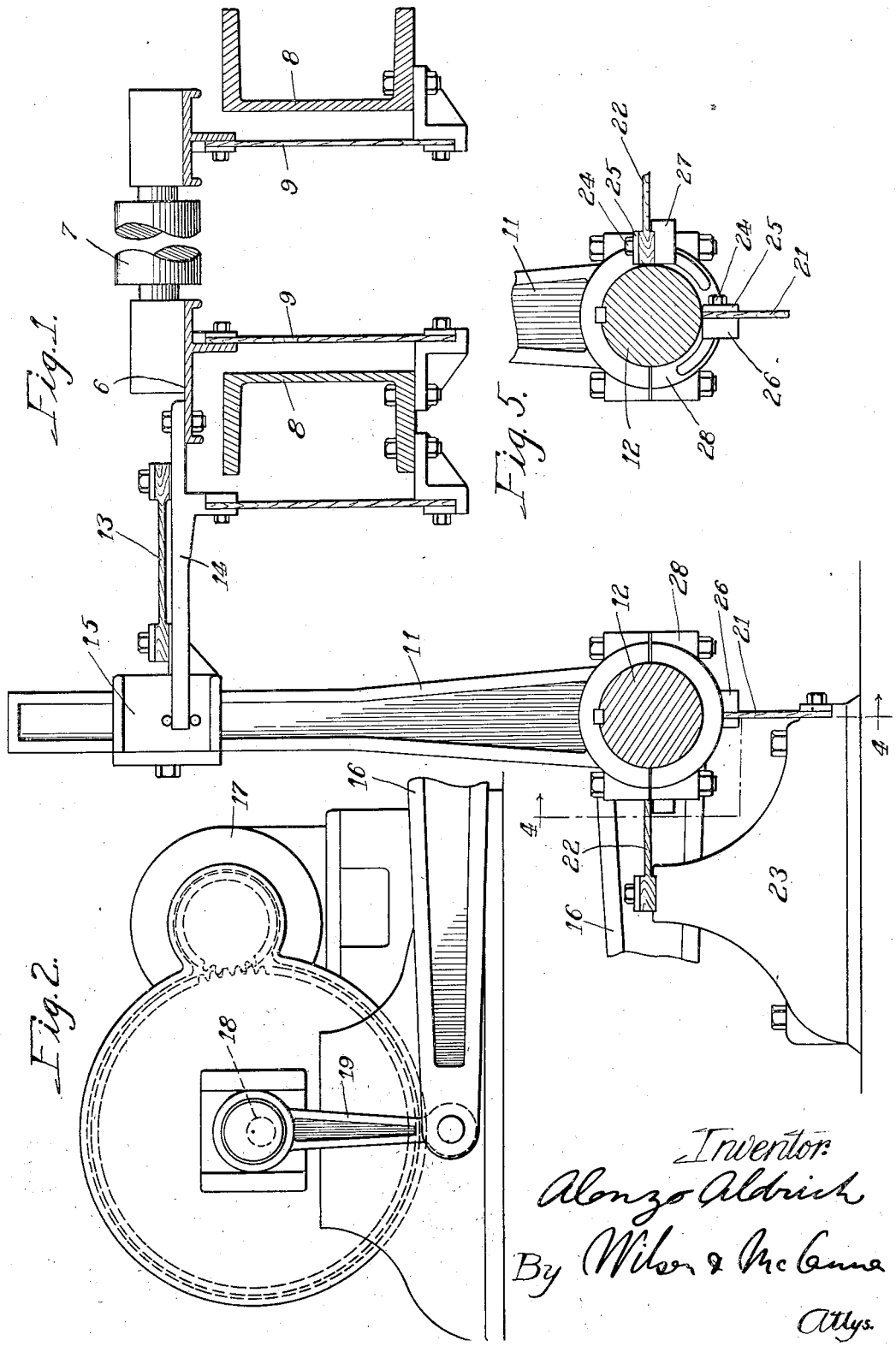

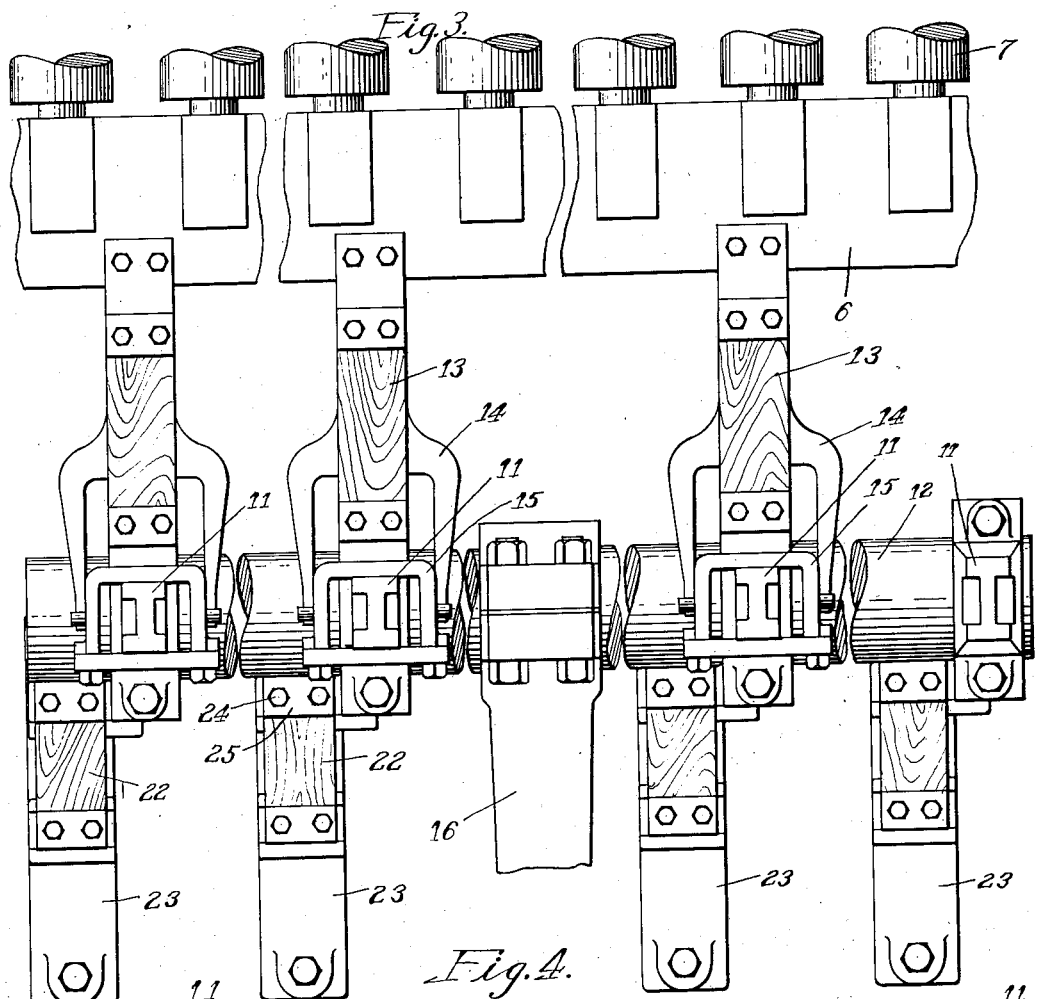
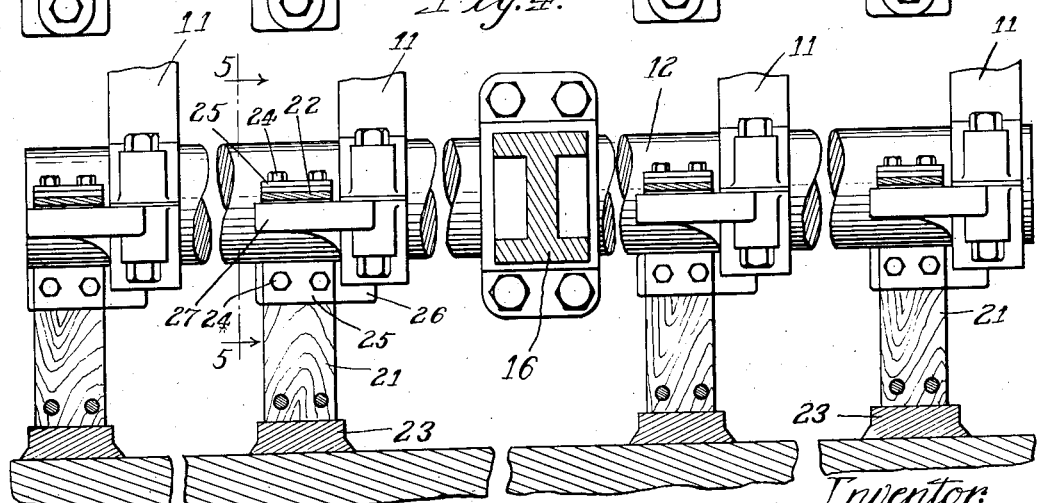

1,629,087

UNITED STATES PATENT OFFICE.

ALONZO ALDRICH, OF BELOIT, WISCONSIN, ASSIGNOR TO BELOIT IRON WORKS, OF BELOIT, WISCONSIN, A CORPORATION OF WISCONSIN.

SHAKER MOUNTING FOR FOURDRINIER MACHINES.

Application filed January 30, 1925. Serial No. 5,696.

This invention relates to the mounting of and support for comparatively heavy vibrating or oscillating parts such for example as are employed in the shaker mechanism of a Fourdrinier machine. The present application is a division of my co-pending application Serial No. 692,644 filed February 14, 1924, which has become Patent No. 1,595,593, in so far as its subject-matter is disclosed in said co-pending application. Because of the heavy weight and the enormous load which must be vibrated or oscillated quite rapidly by mechanism of this kind considerable difficulty has been experienced in providing a thoroughly practical and satisfactory mounting for the parts on a base at which the greatest resistance occurs. Furthermore, because it is desired to impart the vibratory motion at a series of points considerably spaced apart as, for example, to the wire roll-supporting frame and the breast roll frame of a Fourdrinier machine, it is desirable to employ a shaker mechanism having a single oscillatory shaft to which the individual motion-transmitting trains are connected; consequently due to the arrangement of the parts and to the heavy stresses incidental to the rapid vibration under the heavy load, it is necessary that the principal parts shall be of comparatively large cross-section and weight. Under these circumstances ordinary bearings for supporting the oscillatory shaft and the parts carried thereby, fail entirely. In other words because of the excessive friction and wear between the bearing surfaces and the difficulty of lubricating such surfaces and in view of the small and rapid motion, ordinary bearings are impractical.

It is, therefore, the primary purpose of the present invention to provide improved means for supporting a shaker mechanism of the character described; likewise to provide a mounting of this character adapted for application to any similar situation, that is, for the support of any comparatively heavy shaft or vibratory structure.

Another purpose of my invention is to provide a shaker mounting of the character described which will eliminate frictionally engaging parts such as are incidental to ordinary bearings.

Still another purpose is to provide a shaker mounting which will be thoroughly practical and will satisfactorily meet the conditions and requirements for which it is intended.

Other objects and attendant advantages will be appreciated by those skilled in this art as the invention becomes better understood by reference to the following description when considered in connection with the accompanying drawings, in which—

Figure 1, is a fragmentary vertical section transversely through the shaker mechanism of a Fourdrinier machine embodying my invention;

Fig. 2, is a side elevation of a suitable means for imparting the vibratory motion;

Fig. 3, is a fragmentary top view of the structure shown in Fig. 2;

Fig. 4, is a section taken substantially on the line 4—4 of Fig. 2; and

Fig. 5, is a section taken on the line 5—5 of Fig. 4.

My invention in its present embodiment is illustrated as applied to the shaker mechanism of a Fourdrinier machine of the kind disclosed in my copending application, Serial No. 648,959 filed July 2, 1923, which discloses more fully the character of the parts shaken by the present mechanism. I have, however, in the present application briefly shown the organization of these parts, in order to convey a more clear understanding of the invention.

The ultimate parts to be shaken comprise one or more tables or frames designated generally by 6 on which wire rolls 7 are journaled. The table is suitably supported on a main frame 8, in this instance through the agency of a plurality of flexible elements 9 which permit the table to be swung back and forth in a horizontal plane. In view of the large number and size of the rolls and the desire to reduce as much as possible the weight of the table or tables, as the case may be, it is necessary to impart this shaker or vibratory motion at longitudinally spaced points on the table through the intermediary of individual motion-transmitting trains or connections the particular construction of which is not important to the present invention but will be described briefly for purpose of clarity. For example, in the Fourdrinier machine above mentioned, it is desired to employ four such connections, each including an upright shaker arm 11 fixed to an oscillatory or rock shaft 12, and a connection between the shaker arm 11 and table 6 comprising a strap 13, a yoke 14 and a connection-box 15.

The shaft 12 may be rocked or oscillated by any suitable means, such as a rocker arm 16 actuated by a power driven device comprising a motor 17 connected to rotate an eccentric wrist-pin 18 which in turn operates a connecting-rod 19 connected to the rocker arm 16 for oscillating or vibrating the latter.

According to my invention the shaft 12 is mounted at longitudinally spaced points on flexible slab-like elements arranged on a base to carry the weight of the shaft and parts connected thereto and likewise to provide lateral support therefor so as to carry the shaft in a fixed location and yet permit oscillation of the shaft about its longitudinal axis. Said flexible shaft-supporting elements are preferably disposed radially with respect to the shaft and fixedly attached or clamped at their inner ends to the shaft and at their outer ends to a suitable frame or base structure. More particularly, I prefer to employ flexible elements such as flat springs 21 and 22 arranged in a vertical and a horizontal plane, respectively, and secured at their inner ends to the shaft 12 and at their outer ends to a stationary base casting 23. In the example shown, said elements abut against the shaft 12 as shown in Fig. 5, although this is not essential, and are clamped by means of bolts 24 and clamping plates 25 to lugs 26 and 27 respectively, said lugs being integral with the lower half 28 of the bearing-box which secures the shaker arm 11 to the shaft. In order to connect said elements close to the shaft the lugs 26 and 27 are offset to one side of the bearing-box 28 as shown in Fig. 4 and located contiguous to the shaft. In the present embodiment each of said elements comprises a flat slab of hard wood, such for example, as hickory, with the grain running lengthwise of the slab coplanar therewith. Elements of this kind have a molecular structure exceptionally well suited for the purposes in mind; and, inasmuch as the vibratory motion at the periphery of the shaft 12 is comparatively small, in this instance not more than a sixteenth of an inch, the hard wood slabs are amply flexible for the purpose. These supporting elements are a substitute for the usual shaft-supporting bearings, one set of slabs being provided in the place of each such bearing, preferably adjacent to the respective shaker arms 11, as shown in Fig. 4.

It is believed that the foregoing conveys a clear understanding of the objects prefaced above and while I have illustrated but a single working embodiment it should be understood that changes might be made in details of construction without departing from the spirit and scope of the invention as expressed in the appended claims, in which—

I claim:

1. The mounting for an oscillatory shaft comprising sets of flat springs fixed at longitudinally spaced points to the shaft in radial relation thereto and spaced circumferentially to provide vertical and lateral support therefor.

2. The mounting for an oscillatory part comprising a horizontally and a vertically disposed flat, flexible element in planes intersecting the axis of oscillation and providing vertical and lateral support for said part.

3. The mounting for an oscillatory part comprising a plurality of slab-like flexible elements in circumferentially spaced relation about the axis of oscillation of said part, said elements being fixed at their inner ends to said part, and a support to which the outer ends of said elements are fixed.

4. Means providing mounting and support for an oscillatory shaft comprising flexible slab-like elements.

5. Shaker mechanism including a rock shaft and slab-like flexible elements supporting said shaft.

6. Shaker mechanism including a rock shaft the vertical and lateral support of which is solely through the agency of flexible slab-like elements.

7. Shaker mechanism for Fourdrinier machines including a rock shaft, and flexible elements on which the shaft is mounted and supported with capacity to oscillate about its longitudinal axis.

8. Shaker mechanism for Fourdrinier machines including a rock shaft, and hickory slabs providing the support for said shaft, said slabs being arranged so that the shaft may oscillate about its longitudinal axis.

9. Means providing mounting and support for an oscillatory shaft comprising slabs of hickory or the like, radial with respect to the shaft and fixed at their inner ends thereto, and a stationary support to which the outer ends of said slabs are fixed.

10. Shaker mechanism of the character described comprising, in combination, a rock shaft, a stationary base, and flat, flexible elements supporting the shaft on the base with capacity for the shaft to oscillate about its longitudinal axis.

11. Shaker mechanism for Fourdrinier machines comprising in combination with the wire-supporting table, of a rock shaft, means for rocking said shaft, means operated by the shaft for shaking the table, and supports for the shaft, each comprising comparatively flat, flexible springs, one in the vertical plane beneath the shaft and another in a horizontal plane at one side of the shaft.

12. Shaker mechanism for Fourdrinier machines comprising, in combination with the wire-supporting table, of a rock shaft, means for rocking said shaft, means operated by the shaft for shifting the table and supports for the shaft, each comprising a stationary base, and a plurality of flexible elements interposed between the base and the shaft in circumferentially spaced relation, said elements being respectively rigidly attached at their inner ends to the shaft and at their outer ends to the base.

13. A mounting for a rock shaft comprising, in combination, a base, and a plurality of flexible shaft-supporting elements circumferentially spaced about the shaft and fixedly attached at their inner ends thereto and at their outer ends to the base, through the flexure of which the shaft may oscillate about its longitudinal axis.

14. A shaft mounting of the character described comprising, in combination, a shaft, a stationary supporting part, a shaker arm having a split bearing box on the shaft, means rigidly securing said shaker arm to the shaft including bolts for clamping the bearing box thereto, laterally projecting lugs at circumferentially spaced points on said bearing box, flat, flexible shaft-supporting elements bolted to said lugs and extending radially from the shaft, and means rigidly securing the outer ends of said elements to the base, whereby through the flexure of said elements the shaft has capacity for oscillation about its longitudinal axis.

15. Shaker mechanism for Fourdrinier machines comprising, in combination, a table, shaker arms connected to said table for shaking it, a rock shaft to which said arms are attached, means for rapidly rocking the shaft, and a plurality of flat, flexible elements connected to give vertical and lateral support for the shaft, and through the flexure of which the shaft is adapted to be oscillated about its longitudinal axis.

16. Shaker mechanism of the character described comprising, in combination, a rock shaft, means for rapidly oscillating said shaft about its longitudinal axis, means connected to said shaft for transmitting the shaker motion, and means providing the support for the shaft comprising a plurality of flat, flexible elements spaced apart longitudinally of the shaft in horizontal and vertical planes respectively, the vertical elements being disposed beneath the shaft and the horizontal elements at one side thereof, said elements being rigidly attached to the shaft at their ends adjacent thereto, whereby the shaft receives its vertical and lateral support through said elements and is adapted to oscillate by reason of the flexure thereof.

17. In combination, a base an oscillatory part, and means supporting said part on the base comprising a plurality of hard wood slabs disposed in radial relation to the axis of oscillation of said part and spaced circumferentially thereabout, said slabs being fixed at their inner ends to said part and at their outer ends to the base and providing both vertical and lateral support for said part, and said part being adapted to oscillate by reason of the flexure of said slabs.

ALONZO ALDRICH.